US008117486B2

(12) United States Patent
Handley

(10) Patent No.: US 8,117,486 B2
(45) Date of Patent: Feb. 14, 2012

(54) METHOD AND SYSTEM FOR DETECTING AN ANOMALOUS NETWORKED DEVICE

(75) Inventor: John C. Handley, Fairport, NY (US)

(73) Assignee: Xerox Corporation, Norwalk, CT (US)

(*) Notice: Subject to any disclaimer, the term of this patent is extended or adjusted under 35 U.S.C. 154(b) by 694 days.

(21) Appl. No.: 11/733,295

(22) Filed: Apr. 10, 2007

(65) Prior Publication Data
US 2008/0256230 A1 Oct. 16, 2008

(51) Int. Cl.
*G06F 11/00* (2006.01)
(52) U.S. Cl. .......... 714/4.1; 714/4.21; 714/4.3; 714/27; 714/37; 714/40
(58) Field of Classification Search ............. 714/4, 4.1, 714/27, 37, 40, 4.21, 4.3
See application file for complete search history.

(56) References Cited

U.S. PATENT DOCUMENTS

| | | | | |
|---|---|---|---|---|
| 5,796,924 | A * | 8/1998 | Errico et al. ............. | 706/25 |
| 5,983,224 | A * | 11/1999 | Singh et al. ............. | 707/6 |
| 6,304,260 | B1 * | 10/2001 | Wills ............. | 715/853 |
| 6,625,585 | B1 * | 9/2003 | MacCuish et al. ............. | 706/10 |
| 6,798,911 | B1 * | 9/2004 | Jafarkhani et al. ............. | 382/225 |
| 7,047,498 | B2 * | 5/2006 | Lui et al. ............. | 715/762 |
| 7,072,883 | B2 * | 7/2006 | Potok et al. ............. | 707/3 |
| 7,386,611 | B2 * | 6/2008 | Dias et al. ............. | 709/224 |
| 7,448,084 | B1 * | 11/2008 | Apap et al. ............. | 726/24 |
| 7,500,266 | B1 * | 3/2009 | Vukelich et al. ............. | 726/23 |
| 7,567,960 | B2 * | 7/2009 | Wei et al. ............. | 707/5 |
| 7,571,482 | B2 * | 8/2009 | Polyakov et al. ............. | 726/24 |
| 7,584,382 | B2 * | 9/2009 | Verbowski et al. ............. | 714/33 |
| 7,743,123 | B2 * | 6/2010 | Wang et al. ............. | 709/222 |
| 7,761,919 | B2 * | 7/2010 | Gassoway ............. | 726/24 |
| 2002/0087567 | A1 * | 7/2002 | Spiegler et al. ............. | 707/100 |
| 2003/0196094 | A1 * | 10/2003 | Hillis et al. ............. | 713/179 |
| 2005/0188240 | A1 | 8/2005 | Murphy et al. | |
| 2005/0193281 | A1 | 9/2005 | Ide et al. | |
| 2005/0248806 | A1 * | 11/2005 | Klein et al. ............. | 358/1.15 |
| 2006/0022048 | A1 * | 2/2006 | Johnson ............. | 235/462.1 |
| 2006/0132826 | A1 * | 6/2006 | Ciriza et al. ............. | 358/1.15 |
| 2006/0242706 | A1 | 10/2006 | Ross | |
| 2006/0245617 | A1 * | 11/2006 | Shan et al. ............. | 382/103 |
| 2006/0280362 | A1 * | 12/2006 | Umeda ............. | 382/167 |
| 2006/0282236 | A1 * | 12/2006 | Wistmuller ............. | 703/2 |

(Continued)

OTHER PUBLICATIONS

Ming Li, et al. "An information-based sequence distance and its application to whole mitochondrial genome phylogeny", Bioinformatic, 2001, vol. 17 No. 2, pp. 149-154, Oxford University Press.

(Continued)

*Primary Examiner* — Scott Baderman
*Assistant Examiner* — Loan Truong
(74) *Attorney, Agent, or Firm* — Pepper Hamilton LLP

(57) ABSTRACT

Methods and systems for detecting one or more anomalous devices are disclosed. For each of a plurality of devices, semi-structured data may be received from the device. For each pair of devices, of the plurality of devices, a similarity measurement may be determined between semi-structured data from a first device of the pair of devices and semi-structured data from a second device of the pair of devices. One or more anomalous devices may then be identified and one or more remedial actions may be performed for the one or more identified anomalous devices.

18 Claims, 7 Drawing Sheets

U.S. PATENT DOCUMENTS

| | | | |
|---|---|---|---|
| 2007/0022073 A1* | 1/2007 | Gupta et al. | 706/45 |
| 2007/0061487 A1* | 3/2007 | Moore et al. | 709/246 |
| 2007/0100989 A1* | 5/2007 | Papatla | 709/224 |
| 2007/0179921 A1* | 8/2007 | Zitnick et al. | 706/20 |
| 2007/0233862 A1* | 10/2007 | Satish et al. | 709/225 |
| 2008/0040505 A1* | 2/2008 | Britto et al. | 709/238 |
| 2008/0168004 A1* | 7/2008 | Kagarlis et al. | 705/36 R |
| 2009/0222922 A1* | 9/2009 | Sidiroglou et al. | 726/23 |
| 2010/0180128 A1* | 7/2010 | Borden et al. | 713/189 |
| 2010/0216863 A1* | 8/2010 | Helgadottir et al. | 514/44 A |

OTHER PUBLICATIONS

L. Allison, et al. "Sequence complexity for biological sequence analysis", Computers and Chemistry, 2000. vol. 24, pp. 43-55, Elsevier Science LTD.

Dario Bendetta et al., "Language Trees and Zipping", Physical Review Letters, Jan. 28, 2002, vol. 88, No. 4, The American Physical Society.

Wei Peng et al. "Mining logs files for data-driven system management", SIGKDD Explorations, vol. 7, Issue 1, pp. 44-51.

Martin Farach et al. "On the Entropy of DNA: Algorithms and Measurements based on Memory and Rapid Convergence", Sixth Annual ACM-SIAM Sypmosium, Nov. 1, 1999.

Li Wei, et al. "Clustering Workflow Requirements Using Compression Dissimilarity Measure", Sixth Annual IEEE Internatinal Conference On Data Mining, Dec. 2006.

Eamonn Keogh, et al. "Towards Parameter-Free Data Mining", ACM SIGKDD International Conference on Knowledge Discovery and Data Mining, 2004.

Ming Li, et al., (The Similarity Metric), Vltanyi IEEE Transactions on Information Theory vol. 50, No. 12, pp. 3250-3264, 2004.

Eamonn Keogh et al., "On the Need for Time Series Data Mining Benchmark: A Survey and Empirical Demonstration", Data Mining and Knowledge Discovery, 7, 349-371, 2003.

* cited by examiner

METHOD AND SYSTEM FOR DETECTING AN ANOMALOUS NETWORKED DEVICE

BACKGROUND

1. Technical Field

The present disclosure generally relates to methods and systems for analyzing data from networked devices. More particularly, the present disclosure relates to methods and systems for analyzing data to identify whether any analyzed networked device includes information that is anomalous as compared to other analyzed networked devices.

2. Background

Attempts to determine methods for clustering objects into groups have led to the development of numerous clustering algorithms that use a distance or similarity measure to determine the proper clustering of the objects. Such clustering algorithms have been used, for example, in the fields of bioinformatics and language classification.

The efficacy of a clustering algorithm can be determined by evaluating the Kolmogorov complexity for clustered objects. The Kolmogorov complexity is a measure of randomness of a string based on its information content. A string is a finite binary sequence of information. Other finite information sequences can be transformed into a finite binary string prior to determining the Kolmogorov complexity using known methods. The Kolmogorov complexity can be used to quantify the randomness of individual objects in an objective and absolute manner.

The Kolmogorov complexity $K(x)$ of a string x is defined as the length of the shortest program required to compute x on a universal computer, such as a Turing machine. As such, $K(x)$ represents the minimal amount of information required to generate x using an algorithm. The conditional Kolmogorov complexity of string x to string y, $K(x|y)$, is similarly defined as the length of a shortest program required to compute string x if strings is provided as an auxiliary input to the program. Similarly, $K(xy)$ denotes the length of a shortest program required to generate string x and stringy. Based on the Kolmogorov complexity, the distance between two strings x and y has been defined based on the following equation:

$$d_k(x, y) = \frac{K(x|y) + K(y|x)}{K(xy)}.$$

The Kolmogorov complexity represents the ultimate lower bound among all measures of information content. However, it cannot generally be explicitly computed. As such, different techniques have been developed to approximate the Kolmogorov complexity for a text string.

$K(x)$ is essentially the best compression that can be achieved for a text string x. As such, compression algorithms provide an upper bound to the Kolmogorov complexity. For a given data compression algorithm, $C(x)$ can be defined to be the size of string x when compressed using the algorithm. Similarly, $C(x|y)$ can be defined to be the compression achieved by first training the compression on string y and then compressing string x. As such, the Kolmogorov distance equation can be approximated using the following equation for a given text compression algorithm:

$$d_c(x, y) = \frac{C(x|y) + C(y|x)}{C(xy)}.$$

Data compression algorithms for which $d_c$ closely approximates $d_k$ are considered to be superior to algorithms for which $d_c$ does not closely approximate $d_k$.

$d_c$ has been shown to be a similarity metric and has been applied to clustering DNA (see, e.g., Allison et al., "Sequence Complexity for Biological Sequence Analysis," Computers and Chemistry 24(1), pp 43-55 (2000)) and classifying languages (see Benedetto et ah, "Language Trees and Zipping," Physical Review Letters 88, 048702 (2002)). However, the computation of $d_c$ requires altering the chosen compression algorithm to obtain $C(x|y)$ and $C(y|x)$, which can require significant computational effort.

A simplified distance measure (the compression dissimilarity measure or CDM) can be used to approximate $d_c$, as shown in Keogh et al., "Towards Parameter-Free Data Mining," in "The Proceedings of the Tenth ACM SIGKDD international Conference on Knowledge Discovery and Data Mining," pp 206-215 (2004). The CDM value for two strings is defined by the following equation:

$$CDM(x, y) = \frac{C(xy)}{C(x) + C(y)}.$$

In other words, determining the CDM value for two strings does not require determining conditional values, but merely the compression of the strings and a concatenation of the two strings. As such, the computational effort for determining the CDM value is significantly less than the computational effort for determining the approximation of the Kolmogorov complexity $d_c$.

If two objects, x and y, are unrelated, $CDM(x, y)$ is close to 1. As the value of $CDM(x, y)$ decreases, x and y are determined to be more closely related. As such, two objects that are substantially similar have a relatively small CDM value. It should be noted that $CDM(x, x)$ does not equal zero.

Devices, such as computers, printers and other processor-based devices, are commonly connected together via a communications network, such as the Internet, a local area network (LAN) or the like. The use of networks to interconnect devices enables communication and processing operations to be performed among remote devices. For example, information can be passed from a first device to a second device to enable performance of a computing operation. Similarly, information can be distributed among a plurality of devices that are connected to a network to enable distributed processing operations.

A device that is connected to a network, such as a LAN or a wide-area network (WAN), might be configured in a similar manner with other devices on the network. For example, a computer used in a business or scholastic environment could be configured similarly to other computers in the same environment. As such, computers connected to the same LAN tend to have similar software, use the same operating system and/or generally have a similar system configuration. Similarly, other devices that are networked together, such as printers in a print cluster, tend to be similarly configured and perform similar operations. For example, printers connected via a network might have similar print drivers, store similar types of process information and/or the like.

One problem with networked devices is that such devices can be more easily compromised than non-networked devices. For example, an individual could create and distribute a software program, such as a computer virus, worm or other "malware" software program, that is received and stored by a networked device. An exemplary malware program could perform intrusive operations, such as periodically providing system information from an infected device to an unauthorized third party and/or preventing the infected device from performing some or all of its intended operations. Detecting malware can be difficult because malware typically masks itself as a legitimate software application.

Accordingly, systems and methods for clustering devices in a network based on the similarity between such devices and detecting devices in a network having anomalies based on such clusters would be desirable.

SUMMARY

Before the present methods are described, it is to be understood that this invention is not limited to the particular systems, methodologies or protocols described, as these may vary. It is also to be understood that the terminology used herein is for the purpose of describing particular embodiments only, and is not intended to limit the scope of the present disclosure which will be limited only by the appended claims.

It must be noted that as used herein and in the appended claims, the singular forms "a," "an," and "the" include plural reference unless the context clearly dictates otherwise. Thus, for example, reference to a "device" is a reference to one or more devices and equivalents thereof known to those skilled in the art, and so forth. Unless defined otherwise, all technical and scientific terms used herein have the same meanings as commonly understood by one of ordinary skill in the art. As used herein, the term "comprising" means "including, but not limited to."

In an embodiment, a method of detecting one or more anomalous devices may include receiving, for each of a plurality of devices, semi-structured data from the device, determining, for each pair of devices of the plurality of devices, a similarity measurement between semi-structured data from a first device of the pair of devices and semi-structured data from a second device of the pair of devices, identifying one or more anomalous devices, and performing one or more remedial actions for the one or more identified anomalous devices.

In an embodiment, a system for detecting one or more anomalous devices may include a processor, a communication port in communication with the processor, and a processor-readable storage medium in communication with the processor. The processor-readable storage medium contains one or more programming instructions for performing a method of detecting one or more anomalous devices. The method may include, for each of a plurality of devices, receiving semi-structured data from the device, for each pair of devices of the plurality of devices, determining a similarity measurement between semi-structured data from a first device of the pair of devices and semi-structured data from a second device of the pair of devices, identifying one or more anomalous devices, and performing one or more remedial actions for the one or more identified anomalous devices.

BRIEF DESCRIPTION OF THE DRAWINGS

Aspects, features, benefits and advantages of the present invention will be apparent with regard to the following description and accompanying drawings, of which.

DETAILED DESCRIPTION

The term "device" refers to a machine used to perform one or more functions or the operation of the machine based on installed software and/or firmware. Exemplary devices include computers, print engines and other document processing devices, such as printers, scanners, facsimile devices and/or the like. A device contains information representing a device state and/or one or more software programs that are each used to perform one or more functions.

The term "similarity measure" refers to a process used to determine a value (a "similarity measurement") that represents the similarity between device information for device pairs. An exemplary similarity measure may include the Compression Dissimilarity Measure (CDM) described in detail above. It will be apparent to one of ordinary skill in the art that other similarity measures may also be used within the scope of this disclosure.

The embodiment described herein pertains to a network of computers running a Microsoft Windows® operating system. The disclosed embodiment is merely exemplary. Methods and systems incorporating devices having different operating systems and/or different devices may also be used within the scope of this disclosure. For example, a system may identify any devices that use an operating system including a software registry or other application listing. In addition, a system may identify anomalies among other types of devices, such as print engines and/or document processing devices, which contain system variables.

Figure 1:
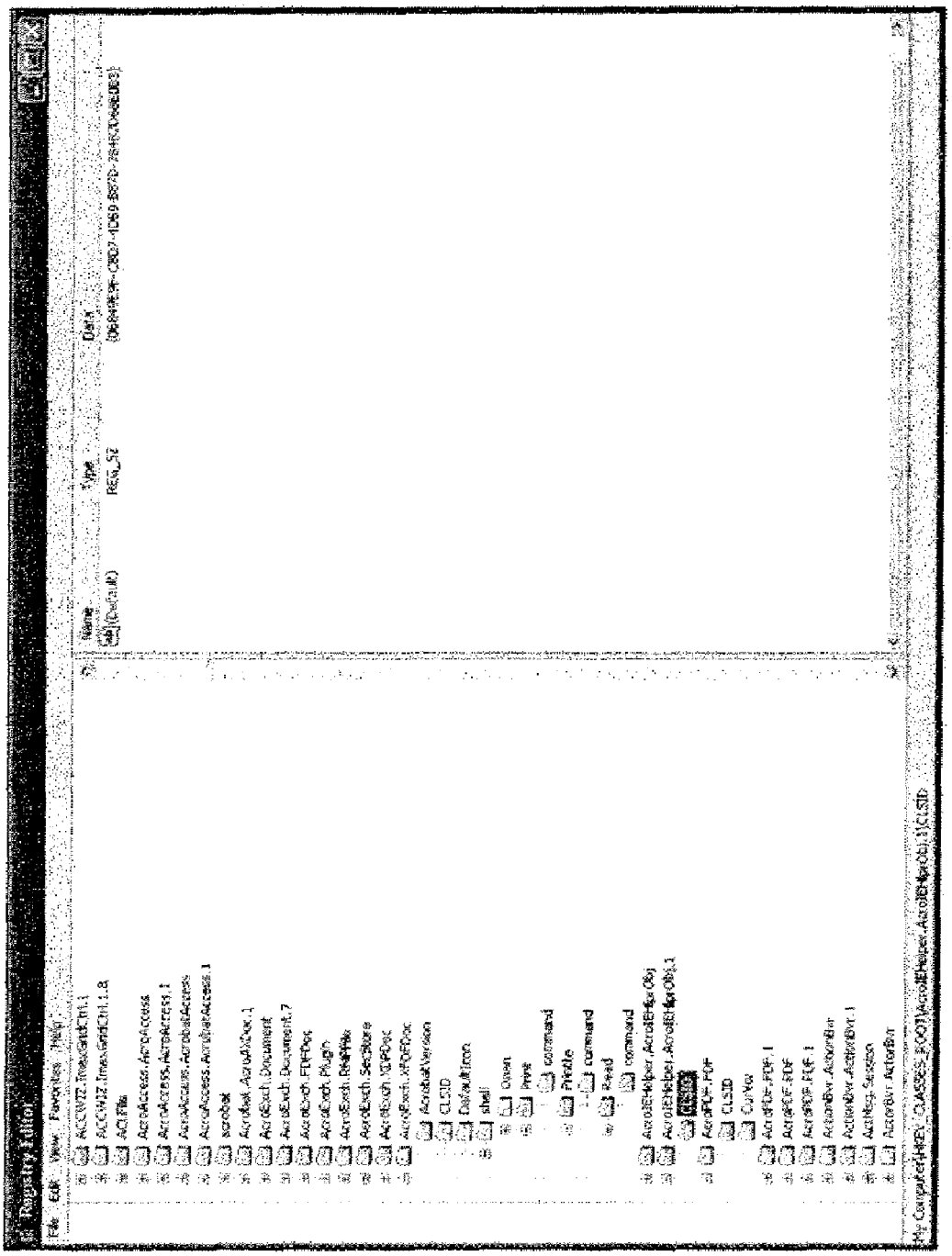
FIG. 1 depicts a screen shot displaying a portion of a software registry for an exemplary device according to an embodiment.

FIG. 1 depicts a screen shot displaying a portion of a software registry for an exemplary device according to an embodiment. As shown in FIG. 1, software applications may be registered in a system registry. The system registry is a semi-structured data file that contains critical information about the processes the computer is configured to run. A semi-structured data file is a file having content that has a tree-based or hierarchical structure.

If a device is infected with a virus, a worm and/or other malware, information that could potentially alert a user or system administrator may be present in the registry. This is because the operating system may require the malware to have an entry in the system registry in order to execute. However, malware may not be detectable using conventional means because malware may mask itself as a legitimate software application.

In an embodiment, detection of anomalous programs, malware, or other issues with devices on a network may be detected by clustering devices based on their registries. Anomalous programs may include unauthorized user-loaded software, spyware, or any other program that is not loaded on a significant portion of a group of devices to be clustered. Similarly configured devices may occupy similar clusters after the clustering operation is performed. Conversely, unusual or anomalous devices may be outliers from the clusters.

A similarity measure may be used to generate clusters based on the device registries. In an embodiment, CDM may be used to cluster the devices based on their registries. It will be apparent to those of ordinary skill in the art that additional and/or alternate similarity measures may be used within the scope of this disclosure.

Figure 2:
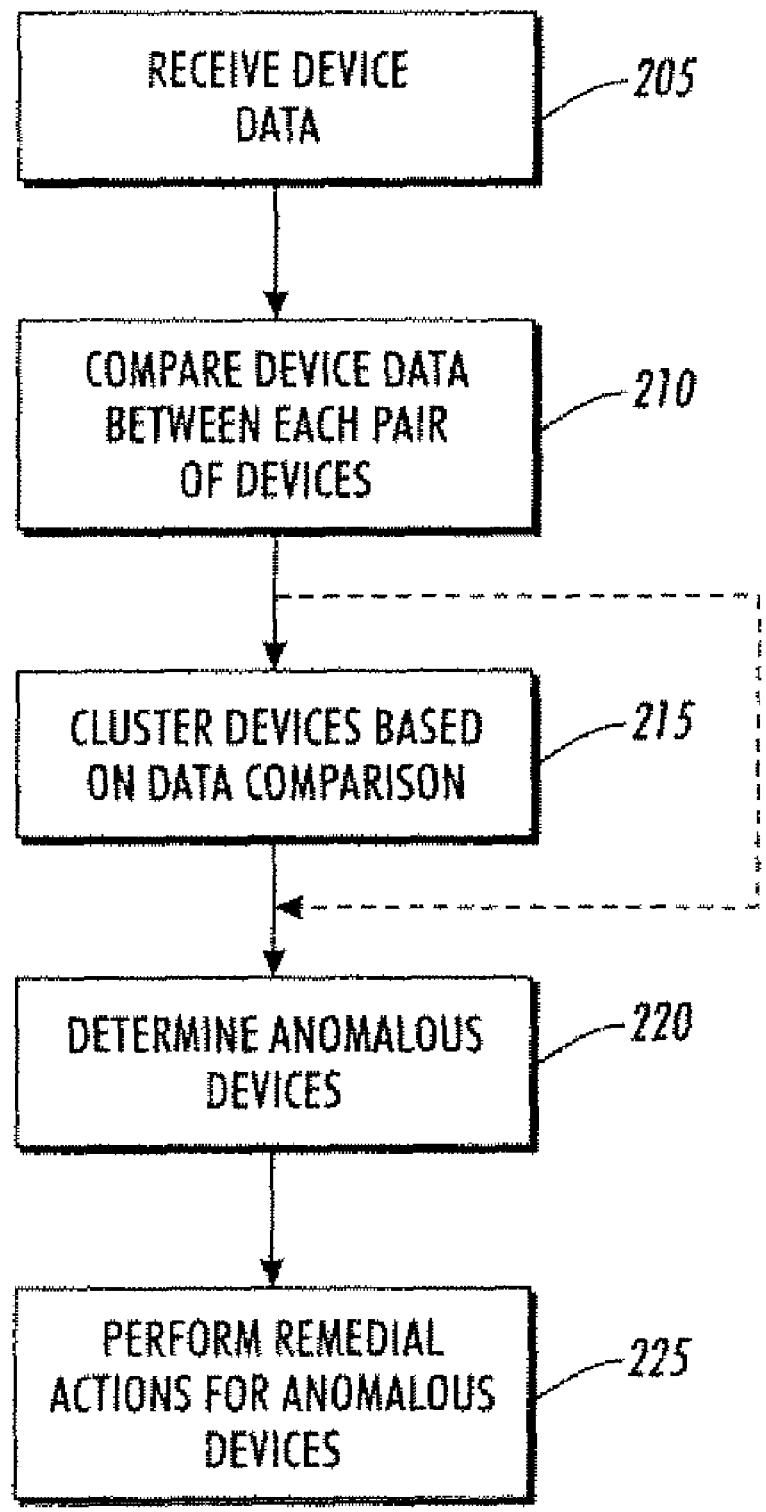
FIG. 2 depicts a flow diagram of an exemplary method of determining anomalous devices in a network according to an embodiment.

FIG. 2 depicts a flow diagram of an exemplary method of determining anomalous devices in a network according to an embodiment. As shown in FIG. 2, data may be received 205 from a plurality of devices in a network. In an embodiment, the data may be semi-structured data, such as a device registry, XML data, HTML data and/or the like. In an embodiment, the data may pertain to software applications registered for a particular device. In an embodiment, the data may pertain to a device state for each of a plurality of print engines and/or other document processing devices.

The data for the plurality of devices may then be compared 210 in a pairwise fashion to determine a similarity measure, such as CDM, for each device pair. In other words, data for a first device and data for a second device may be compared 210. Measuring similarity between two devices using CDM may be implemented in various ways. In an embodiment, data for a first device x may be compressed. The compressed data for the first device may have a size equal to C(x). Likewise, data for a second device y may be compressed. The compressed data for the first device may have a size equal to C(y). The data for the first and second devices may also be concatenated and compressed. The concatenated compressed data may have a size C(xy). The size of the concatenated compressed data C(xy) may then be divided by the sum of the size of the compressed data for the first device C(x) and the size of the compressed data for the second device C(y) to determine the value of the similarity measure between devices x and y (i.e., CDM(x, y)). In an embodiment, a compressor may include WinZip developed by WinZip Computing, Inc., PKZIP developed by PKWARE, Inc., gzip developed by Jean-loup Gailly and Mark Adler, or any other compressor based on a universal lossless string compression algorithm.

In an embodiment, when similarity measurements have been determined on a pairwise basis between the data for each pair of devices in the plurality of devices, any suitable clustering algorithm may be used to cluster 215 devices having similar data into device clusters. For example, clustering may be performed 215 using one or more of hierarchical agglomerative clustering, K-means clustering and the like.

Hierarchical agglomerative clustering may be performed by regarding each object as a separate cluster, then merging these atomic clusters into larger clusters, until one or more pre-defined termination conditions are satisfied. At each step, the two most similar objects (clusters or single object) may be identified and merged into a larger cluster. Deciding which two clusters are closest may be performed using a measure of the distance between each remaining pair of clusters. Such proximity measure is called a linkage metric. Major inter-cluster linkage metrics include single link, complete link, and average link.

A single link metric may measure the similarity of two clusters based on the distance between their closest (i.e., most similar) points. The single link metric may often generate long straggle clusters. $d(C_1, C_2)=\min \{d(x,y)|x \in C_1, y \in C_2\}$.

A complete link metric may measure the similarity of two clusters based on the similarity of their most distant (i.e., least similar) points. The complete link metric may tend to form compact clusters. $d(C_1, C_2)=\max \{d(x, y)|x \in C_1, y \in C_2\}$.

An average link metric may measure the similarity of two clusters based on the average similarity of the points contained in the clusters. $d(C_1, C_2)=\text{average} \{d(x,y)|x \in C_1, y \in C_2\}$.

The particular link metric used to measure similarity may have an effect on the outlier determination because different link metrics reflect different measures of closeness and connectivity. In an embodiment, values for a plurality of link metrics may be determined. Device data may be considered close to other device data, for example, if the distance between the data for each device is less than the distance between the data for the device and data for any other device. Relative "closeness" may depend on the nature of the data. Other methods of determining closeness may also be performed within the scope of the present disclosure.

Figure 3:
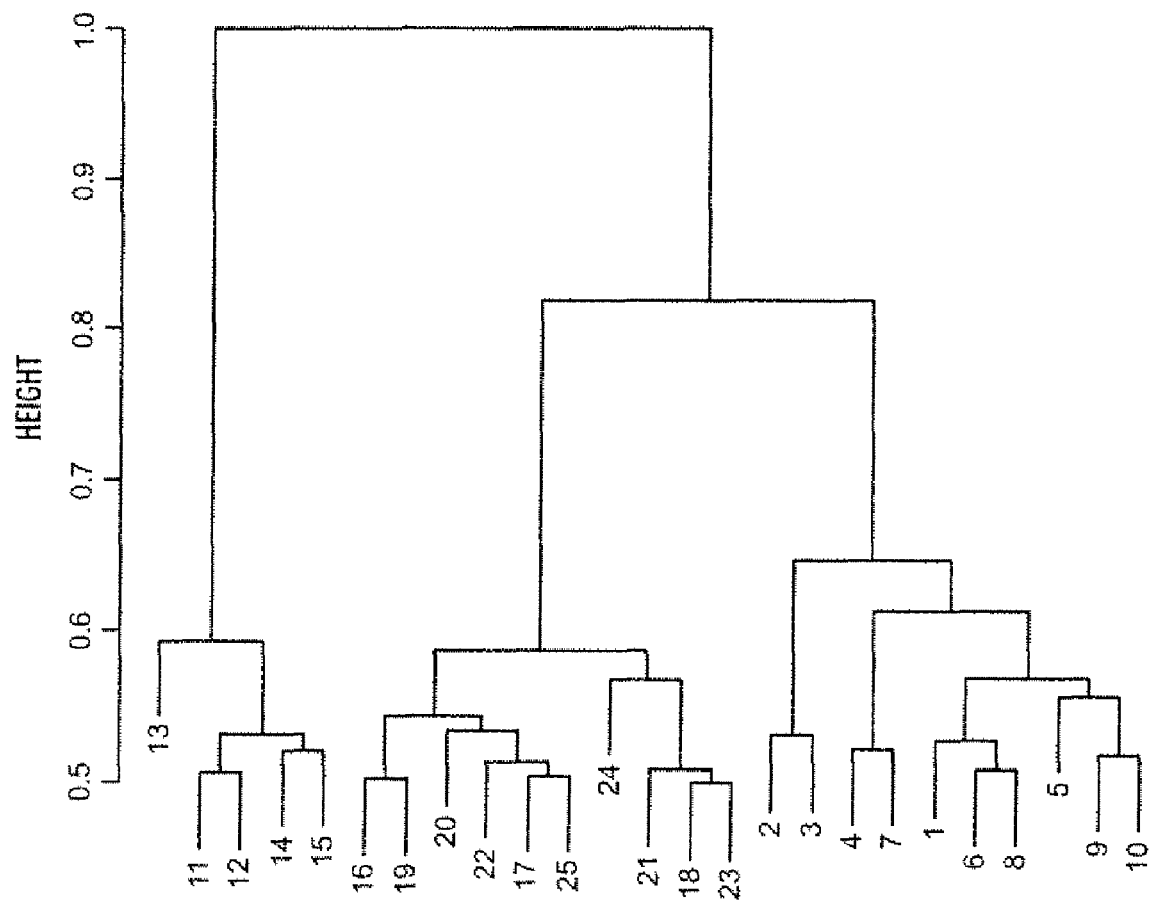
FIG. 3 depicts an exemplary diagram of clusters formed using hierarchical agglomerative clustering.

FIG. 3 depicts an exemplary diagram of clusters formed using hierarchical agglomerative clustering. As illustrated in FIG. 3, 25 devices were clustered based on the distance between each device and/or cluster of devices. Clusters may be determined by selecting a distance threshold between clusters. Clusters that exceed this threshold are determined to be distinct. For example, a distance threshold of 0.7 may result in a determination of three clusters: $\{1, \ldots, 10\}$, $\{11, \ldots, 15\}$ and $\{16, \ldots, 25\}$. Likewise, a distance threshold of 0.59 may result in a determination of four clusters: $\{1, 10\}$, $\{11, 12, 14, 15\}$, $\{13\}$ and $\{16, \ldots, 25\}$. Different distance thresholds may result in a different number of clusters.

An optimal threshold may be determined by selecting the threshold that optimizes a measure of cluster separation and compactness. The optimal threshold may result in clusters that are tightly arranged about a center and distant from every other cluster. One such measure for determining an optimal threshold is the Silhouette Coefficient. The Silhouette Coefficient for a device may be determined based on the average distance of a device to the other devices in its cluster and the minimum distance from the device to a device not in its cluster. Mathematically, this may be represented using the following equations:

$$a(i) = \frac{1}{|C_i|} \sum_{j \in C_i} d_{ij},$$

where $d_{ij}$ is the CDM distance between each pair of devices i and j where there are N devices;

$C_i$ denotes all the other devices in the cluster containing device i; and $|C_i|$ denotes the number of devices in $C_i$.

$$b(i) = \min_{C \in K(C_i)} \left\{ \frac{1}{|C|} \sum_{j \in C} d_{ij} \right\},$$

where $K(C_i)$ denotes all clusters other than $C_i$.

Using these values, the Silhouette Coefficient for device i may be defined as the following:

$$S(i) = \frac{b(i) - a(i)}{\max\{a(i), b(i)\}}.$$

Likewise, the Silhouette Coefficient for a clustering is the average of the Silhouette Coefficients for the devices in the clustering:

$$S(C) = \frac{1}{N} \sum_{i=1}^{N} S(i).$$

For each threshold applied to the hierarchical agglomerative clustering, a clustering may be determined and the Silhouette Coefficient S(C) may be determined. The clustering that is closest to 1.0 may be determined to be the optimal clustering. In an embodiment, if a cluster in the optimal clustering has a single device, the device may be determined to be an outlier.

K-means clustering may be performed by first determining a value K equal to the number of clusters to find. Next, a set of initial cluster centers, $x_1, \ldots, x_K$, may be chosen. These may be chosen at random or by good guesses. For each point or device x in the dataset, compute the distances from that point to each of the centers: $d_i = d(x, x_i)$, $i=1, \ldots, K$. Device x may be assigned to the cluster with the closest center. After all points or devices have been assigned, each center may be re-determined by computing the medoid for each cluster. A medoid is a representative object of a data set determined by finding the center of a cluster and selecting the object that is closest to the center. After selecting the medoid, the distances between the medoid and the other points are re-determined. For example, if the members of cluster i are determined to be $\{x_{i1}, \ldots, x_m\}$, the new center or medoid is the point or device y in the set which minimizes $$\sum_{j=1}^{n} d(y, x_{ij}).$$

The new centers for each cluster are used to assign all the points or devices to the cluster with the closest center. The process is repeated until the cluster centers do not change after each iteration.

Once devices have been grouped into clusters 215, anomalous devices may be determined 220 by detecting outliers from the clusters. In an embodiment, an outlier may include a device that is grouped into a cluster having only one device or a relatively small number of devices as compared to other clusters. In an embodiment, an outlier may represent a device that has a device registry that is substantially dissimilar to device registries for most or all other devices.

A multidimensional representation of the Euclidian distances between each pair of devices obtained using the dissimilarity measure, such as CDM, may be determined. In an embodiment, the multidimensional representation may be 2-dimensional. One method of generating the representation may be performed using a multidimensional scaling algorithm. In multidimensional scaling, a pairwise set of CDM device distances $\{d_{ij}: 1 \leq i < j \leq N\}$ may be used to find coordinates in a plane $\{(x_1, y_1), \ldots, (x_N, y_N)\}$ such that the pairwise Euclidian distances are as close as possible to the pairwise device distances. In other words, the algorithm may attempt to minimize the stress of the representation. The stress may be defined as $$\sum_{1 \leq i < j \leq N} \left[ d_{ij} - \sqrt{(x_i - x_j)^2 + (y_i - y_j)^2} \right]^2.$$

Figure 4:
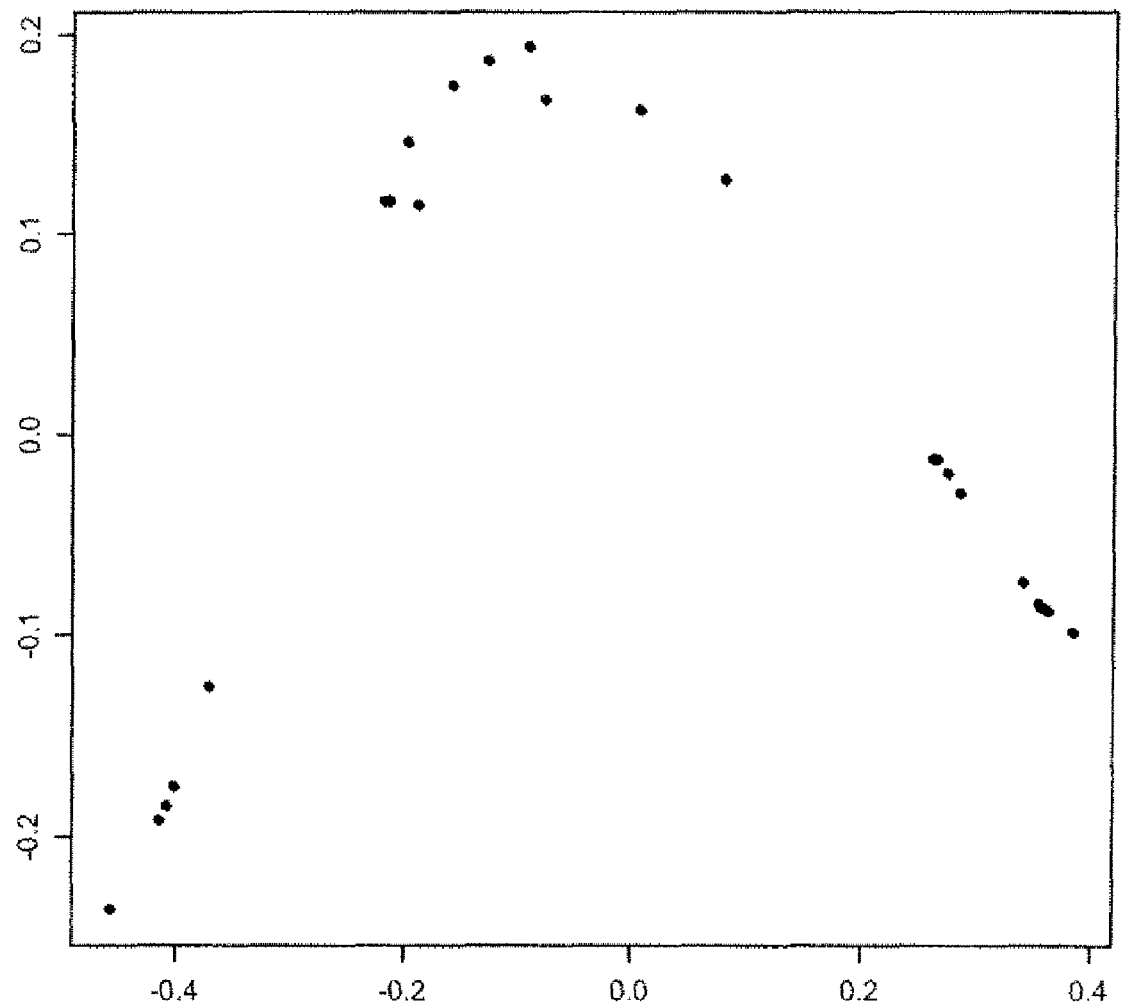
FIG. 4 depicts a two-dimensional representation of exemplary device distances according to an embodiment.

FIG. 4 depicts a two-dimensional representation of exemplary device distances according to an embodiment. The representation depicted in FIG. 4, or a similar representation, may be used to detect clusters of devices. For example, the representation depicted in FIG. 4 may be used to identify three clusters. In an embodiment, the representation may be updated in real time as new information is received.

In an alternate embodiment, outliers may be determined 220 without forming clusters using, for example, the Hampel method. First, for each device, the distance from each device to its closest neighbor may be determined. These distances may be defined as $\{d_1, \ldots, d_N\}$. The median m of these values may be determined by ordering the distances from smallest to largest $d_{(1)} \leq d_{(2)} \leq \ldots \leq d_{(N)}$ and selecting the middle value (i.e., $d_{((N+1)/2)}$ if N is odd or $(d_{(N/2)} + d_{(N/2+1)})/2$ if N is even). Using the median, the median absolute difference (MAD) from each distance to the median may be determined (i.e., the median of $\{|d_1 - m|, \ldots, |d_N - m|\}$). A spread value may be defined to be, for example, in the range from about 2 to about 5. However, alternate spread values may be selected within the scope of this disclosure as will be apparent to one of ordinary skill in the art. Larger values may be used to make outlier detection more conservative. A device i may be determined to be an outlier or anomalous if $d_1 > m + \text{spread} \times \text{MAD}$.

Figure 5:
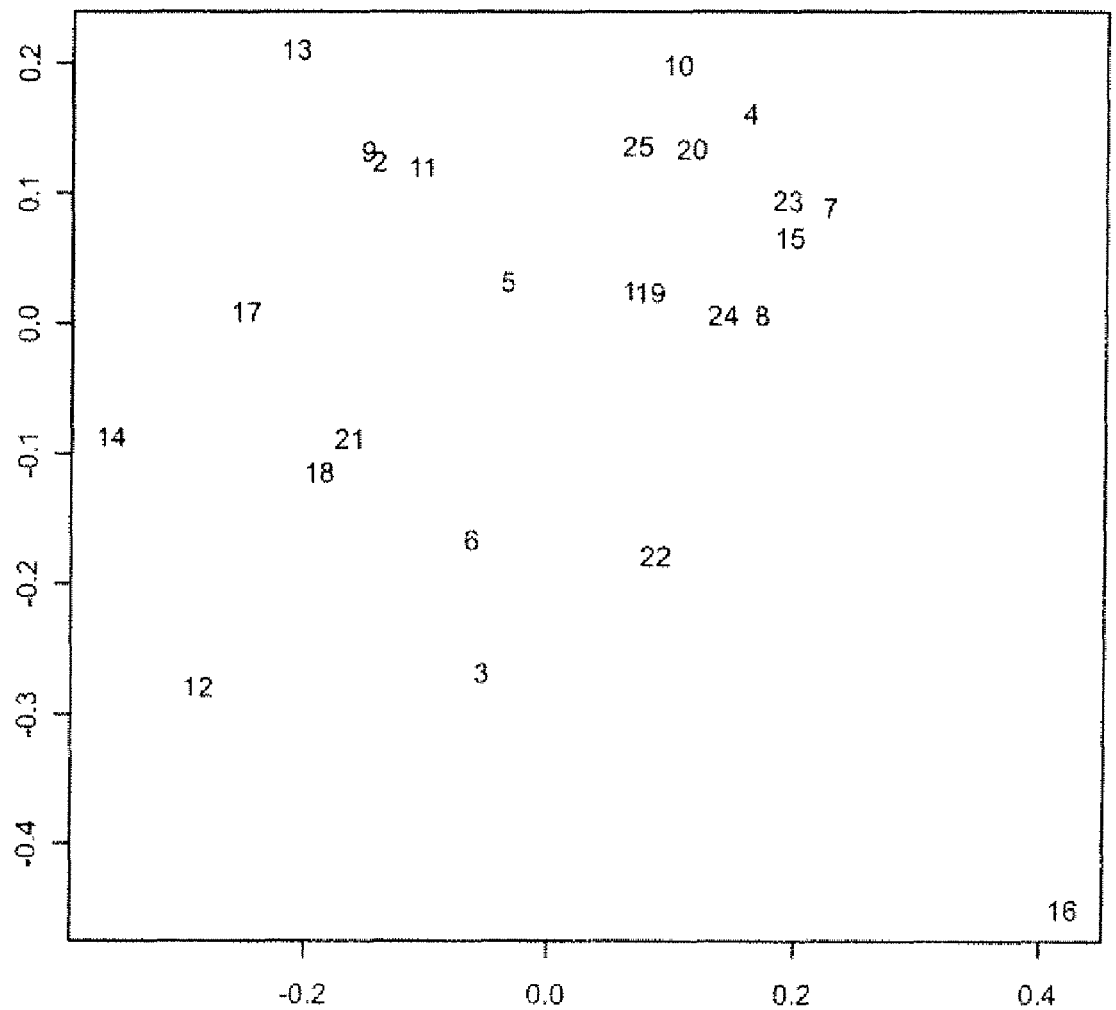
FIG. 5 depicts an exemplary 2D projection of devices with numeric labels.
Figure 6:
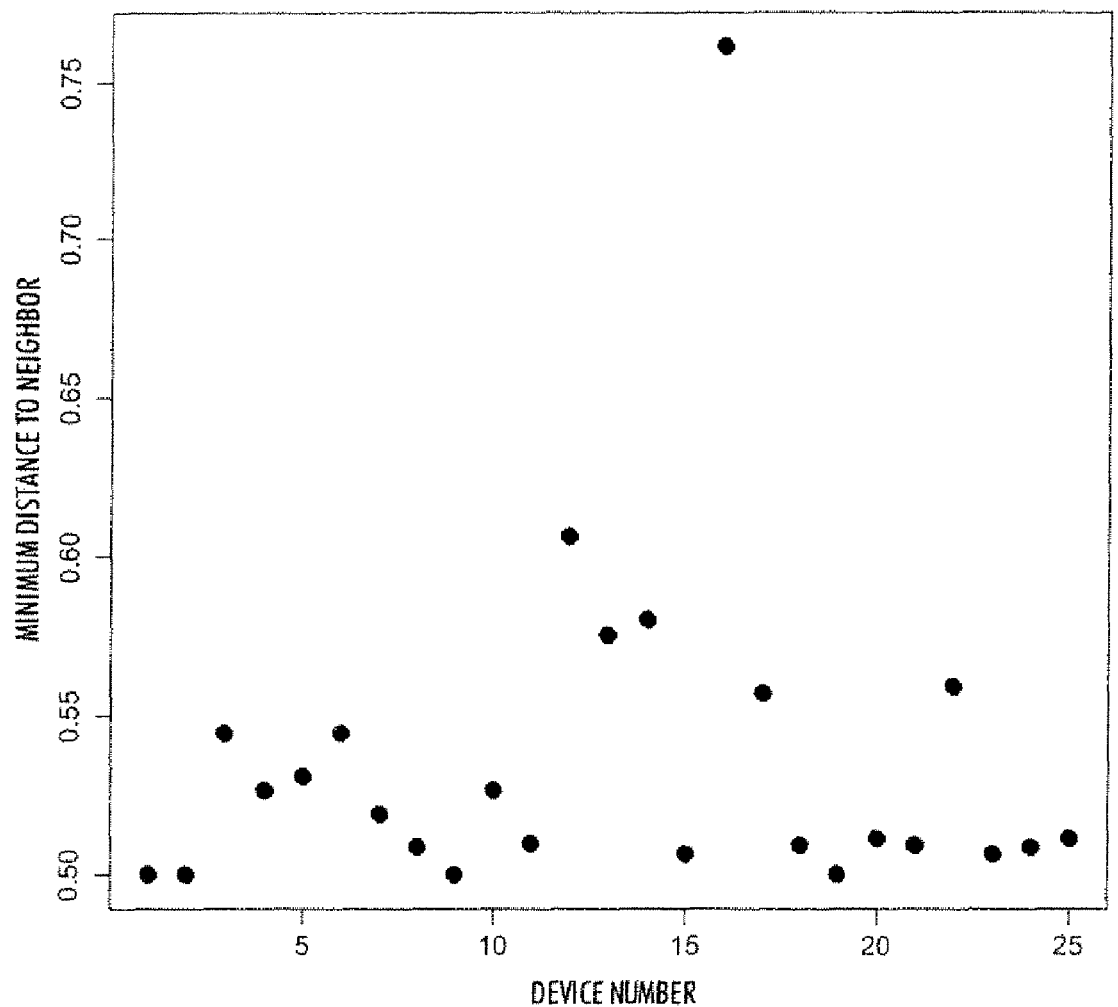
FIG. 6 depicts exemplary distances between each device in FIG. 5 and its nearest neighboring device.

FIG. 5 depicts an exemplary 2D projection of devices with numeric labels. As shown in FIG. 5, device 16 may be determined to be anomalous because the minimum distance to another device identifies it as a statistical outlier using the Hampel method. FIG. 6 depicts exemplary distances $d_1, \ldots, d_{25}$ between each device i in FIG. 5 and its nearest neighboring device. Based on the Hampel method, the median of the distances may be 0.5113166 in this example. The median absolute deviation (MAD) may be 0.07354964. If the spread value is selected to be 3.0, the Hampel threshold value may be determined to be 0.5113166+3.0*0.07354964=0.7319655. Device number 16 may be determined to be anomalous because the distance to its nearest neighboring device, $d_{16}$, may equal 0.7612829, which is greater than the Hampel threshold value.

One or more remedial actions may be performed 225 with respect to the anomalous devices. Exemplary remedial actions may include removing anomalous devices from the network, shutting down anomalous devices, and/or notifying users of anomalous devices that such devices are anomalous. Additional and/or alternate remedial actions may be performed within the scope of the present disclosure as will be apparent to one of ordinary skill in the relevant art.

In an embodiment, one or more remedial actions may be performed 225 automatically. In an alternate embodiment, a system administrator may receive an alert regarding the presence of one or more anomalous devices and/or information identifying the one or more anomalous devices. In an embodiment, information derived from the clustering operation may be displayed to the system administrator. The derived information may include a multi-dimensional scaling representation of the similarity measurements. The multi-dimensional scaling representation may be used to compress the data for each device into a number of data elements that is able to be conveniently displayed to a user, such as one to three data values. However, the data may be compressed, if applicable, into any number of data elements within the scope of the present disclosure.

In an exemplary embodiment, a plurality of networked computers may have common software packages installed during an installation process. A software registry may be created as part of the installation process to identify the software programs that are registered with each computer and data pertinent to the operating system installed on the computer. For example, a Microsoft Windows® registry is a database of all configuration settings in Microsoft Windows® operating systems. It contains information and settings for all the hardware, operating system software, most non-operating system software, users, preferences of the computer, and the like. Whenever a user makes changes to Control Panel settings, file associations, system policies, and/or installed software, the changes are reflected and stored in the registry. An exemplary Microsoft Windows® registry is depicted in FIG. 1.

The disclosed methods may enable the detection of anomalies on the networked computers based on the information stored in the Microsoft Windows® registry for each computer. For example, when the registries are compared, a device on which the user has installed additional unapproved software, updated software, or the like will contain additional or different registry information as compared to a device for which merely the installed software has been downloaded. Moreover, a computer containing malware may likewise contain different information or additional information in the registry. When the networked computers are compared against one another, the CDM value for computers having the same software configurations will be $$CDM(x, x) = \frac{C(xx)}{C(x) + C(x)} = \frac{C(xx)}{2C(x)}.$$

As such, $$CDM(x, x) \approx \frac{1}{2}.$$

In contrast, computers having different registries that are compared will have larger CDM values. The particular CDM values will depend on the particular differences between the data contained in the registries for the two computers. Outlier computers may then be identified and information may be provided to, for example, a system administrator. The system administrator may examine the computers and determine the cause of the outlier status.

In an alternate exemplary embodiment, a plurality of document processing devices may be networked together. For example, a plurality of printers may be networked together to form a print cluster. Each printer may include system data stored in a plurality of memory elements. In an embodiment, the memory elements may be arranged in a hierarchy based on the portion of the printer to which they pertain. For example, memory elements containing data pertaining to statistical information may be arranged in one group, memory elements containing data to system parameters (internal temperature, toner levels, etc.) may be arranged in a second group, and the like. Such data (i.e., semi-structured data) may be organized based on the memory element groupings.

Each printer in the print cluster may have substantially similar parameters for at least a portion of the information stored in the memory elements if the devices operate in a normal state. However, a faulty machine, such as one that is operating at too high a temperature, or a machine which has a component that needs to be replaced, such as a toner cartridge, may write an atypical value to a particular memory element corresponding to the fault or desired replacement part. When the printers are clustered according to the data contained in their memory elements, devices having atypical values will appear as outliers from the other devices in the plurality of document processing devices. A user or automated process may then inspect the values contained in the memory elements to determine the one or more memory elements causing the device to be an outlier. For example, if a memory element corresponding to a toner level exhibits a value showing that the toner is almost extinguished, the user or automated process may determine that the toner cartridge should be replaced in the corresponding device. Alternate device issues may be similarly resolved based on the one or more memory elements that cause a device to be an outlier.

Figure 7:
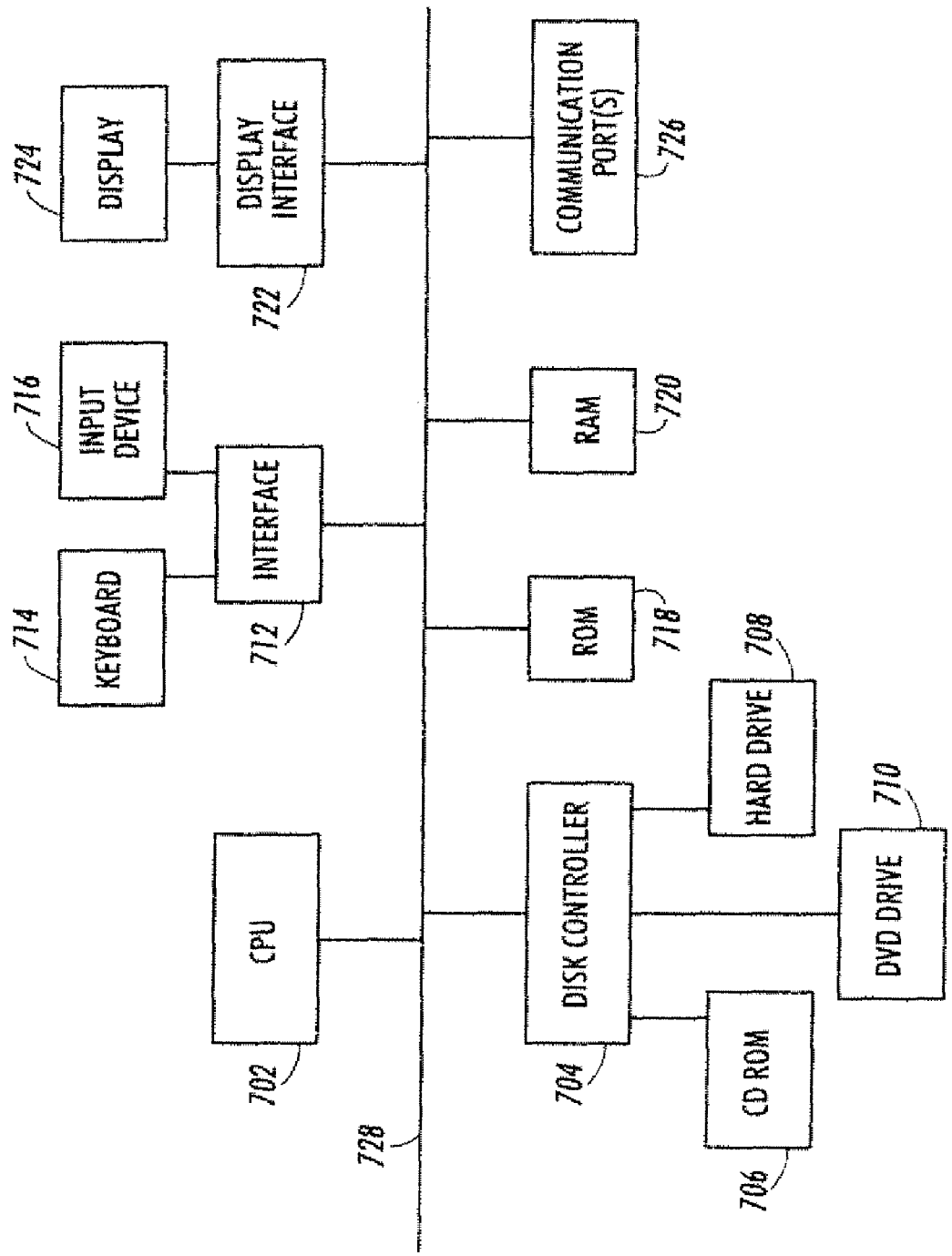
FIG. 7 is a block diagram of exemplary internal hardware that may be used to contain or implement the program instructions according to an embodiment.

FIG. 7 is a block diagram of exemplary internal hardware that may be used to contain or implement the program instructions according to an embodiment. Referring to FIG. 7, a bus 728 serves as the main information highway interconnecting the other illustrated components of the hardware. CPU 702 is the central processing unit of the system, performing calculations and logic operations required to execute a program. Read only memory (ROM) 718 and random access memory (RAM) 720 constitute exemplary memory devices.

A disk controller 704 interfaces with one or more optional disk drives to the system bus 728. These disk drives may include, for example, external or internal DVD drives 710, CD ROM drives 706 or hard drives 708. As indicated previously, these various disk drives and disk controllers are optional devices.

Program instructions may be stored in the ROM 718 and/or the RAM 720. Optionally, program instructions may be stored on a computer readable medium such as a compact disk or a digital disk or other recording medium, a communications signal or a carrier wave.

An optional display interface 722 may permit information from the bus 728 to be displayed on the display 724 in audio, graphic or alphanumeric format. Communication with external devices may occur using various communication ports 726. An exemplary communication port 726 may be attached to a communications network, such as the Internet or an intranet.

In addition to the standard computer-type components, the hardware may also include an interface 712 which allows for receipt of data from input devices such as a keyboard 714 or other input device 716 such as a mouse, remote control, pointer and/or joystick.

An embedded system, such as a sub-system within a xerographic apparatus, may optionally be used to perform one, some or all of the operations described herein. Likewise, a multiprocessor system may optionally be used to perform one, some or all of the operations described herein.

In an embodiment, pairwise device distances may be displayed via a graphical interface, such as display interface 722.

It will be appreciated that various of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art which are also intended to be encompassed by the disclosed embodiments.

What is claimed is:

1. A method for detecting one or more anomalous devices, the method comprising:
   for each of a plurality of devices, receiving, from the device, semi-structured system registry data corresponding to one or more applications on the device;
   for each pair of devices of the plurality of devices, determining a similarity measurement between first semi-structured system registry data from a first device of the pair of devices and second semi-structured system registry data from a second device of the pair of devices by:
      compressing the first semi-structured system registry data and the second semi-structured system registry data,
      determining a first size associated with the compressed first semi-structured system registry data,
      determining a second size associated with the compressed second semi-structured system registry data,
      concatenating the first semi-structured system registry data and the second semi-structured system registry data to create concatenated semi-structured system registry data, and
      determining the similarity measurement by determining a ratio of a size of the concatenated semi-structured system registry data and a sum of the first size and the second size;
   clustering the devices based on the determined similarity measurements to form one or more device clusters;
   identifying one or more outliers based on the clustering, wherein an outlier represents an anomalous device that is part of a cluster that has a small number of devices as compared to other clusters; and
   performing one or more remedial actions for the one or more identified anomalous devices.

2. The method of claim 1 wherein using the determined similarity measurements to identify one or more anomalous devices comprises:
   for each device:
      determining one or more distances for the device, wherein each of the one or more distances is determined between the device and one of the plurality of devices other than the device, and
      selecting a minimum distance for the device from the one or more distances;
   determining a median distance from the minimum distances for each of the plurality of devices;
   for each device, determining an absolute value of a difference between the minimum distance for the device and the median distance;
   determining a median absolute deviation equal to a median of the absolute values; and
   for each device, identifying the device to be anomalous if the minimum distance for the device exceeds a sum of the median distance and a product of a positive constant and the median absolute deviation.

3. The method of claim 1, wherein the clustering algorithm comprises one or more of hierarchical agglomerative clustering and K-means clustering.

4. The method of claim 3 wherein determining a distance comprises determining one or more of a single link metric, a complete link metric and an average link metric.

5. The method of claim 1 wherein receiving semi-structured system registry data from the device comprises receiving XML data from the device.

6. The method of claim 1 wherein determining a similarity measurement comprises determining a value for a compression dissimilarity measure.

7. The method of claim 1 wherein each device comprises one or more of a computer, a print engine and a document processing device.

8. The method of claim 1 wherein performing one or more remedial actions comprises providing information identifying the one or more anomalous devices.

9. The method of claim 1, further comprising:
   displaying a graph representing differences between the similarity measurements for each device.

10. A system for detecting one or more anomalous devices, the system comprising:
    a processor;
    a communication port in communication with the processor; and
    a processor-readable storage medium in communication with the processor, wherein the processor-readable storage medium comprises one or more programming instructions for:
      for each of a plurality of devices, receiving, from the device, semi-structured system registry data corresponding to one or more applications on the device,
      for each pair of devices of the plurality of devices, determining a similarity measurement between first semi-structured system registry data from a first device of the pair of devices and second semi-structured system registry data from a second device of the pair of devices by:
         compressing the first semi-structured system registry data and the second semi-structured system registry data,
         determining a first size associated with the compressed first semi-structured system registry data,
         determining a second size associated with the compressed second semi-structured system registry data,
         concatenating the first semi-structured system registry data and the second semi-structured system registry data to create concatenated semi-structured system registry data, and
         determining the similarity measurement by determining a ratio of a size of the concatenated semi-structured system registry data and a sum of the first size and the second size;
      clustering the devices based on the determined similarity measurements to form one or more device clusters;
      identifying one or more outliers based on the clustering, wherein an outlier represents an anomalous device that is part of a cluster that has a small number of devices as compared to other clusters; and
      performing one or more remedial actions for the one or more identified anomalous devices.

11. The system of claim 10 wherein identifying one or more outliers comprises one or more programming instructions for performing the following:
    for each device:
       determining one or more distances for the device, wherein each of the one or more distances is determined between the device and one of the plurality of devices other than the device, and
       selecting a minimum distance for the device from the one or more distances;
    determining a median distance from the minimum distances for each of the plurality of devices;

for each device, determining an absolute value of a difference between the minimum distance for the device and the median distance;

determining a median absolute deviation equal to a median of the absolute values; and for each device, identifying the device to be anomalous if the minimum distance for the device exceeds a sum of the median distance and a product of a positive constant and the median absolute deviation.

12. The system of claim 10 wherein the one or more programming instructions for clustering the devices comprise one or more programming instructions for performing one or more of hierarchical agglomerative clustering and K-means clustering.

13. The system of claim 12 wherein determining a distance comprises one or more programming instructions for determining one or more of a single link metric, a complete link metric and an average link metric.

14. The system of claim 10 wherein receiving semi-structured system registry data from the device comprises one or more programming instructions for receiving XML data from the device.

15. The system of claim 10 wherein determining a similarity measurement comprises one or more programming instructions for determining a value for a compression dissimilarity measure.

16. The system of claim 10 wherein each device comprises one or more of a computer, a print engine and a document processing device.

17. The system of claim 10, wherein performing one or more remedial actions comprises one or more programming instructions for performing one or more of the following:

providing information identifying the one or more anomalous devices to a user;

removing the anomalous device from a network; and shutting down the anomalous device.

18. The system of claim 10, wherein the processor-readable storage medium further comprises one or more programming instructions for performing the following:

displaying a graph representing differences between the similarity measurements for each device.

* * * * *